United States Patent [19]

Stratton

[11] Patent Number: 4,803,547
[45] Date of Patent: Feb. 7, 1989

[54] ADAPTIVE COMB FILTERING SYSTEM FOR PROCESSING VIDEO SIGNALS

[75] Inventor: Boyd L. Stratton, Woodside, Calif.

[73] Assignee: Harris Corporation, Melbourne, Fla.

[21] Appl. No.: 36,851

[22] Filed: Apr. 10, 1987

[51] Int. Cl.⁴ .............................................. H04N 9/78
[52] U.S. Cl. ....................................... 358/31; 358/40
[58] Field of Search .................. 358/31, 40, 166, 167, 358/36, 37

[56] References Cited

U.S. PATENT DOCUMENTS

| | | | |
|---|---|---|---|
| 4,050,084 | 9/1977 | Rossi | 358/31 |
| 4,072,984 | 2/1978 | Kaiser | 358/31 |
| 4,240,105 | 12/1980 | Faroudja | 358/31 |
| 4,684,989 | 8/1987 | Roeder | 358/167 |
| 4,694,342 | 9/1987 | Klees | 358/167 |

Primary Examiner—Tommy P. Chin
Attorney, Agent, or Firm—Tarolli, Sundheim & Covell

[57] ABSTRACT

The adaptive comb filtering system presented herein is used to separate the luminance and chrominance components of a composite video signal. This video signal is comprised of a plurality of successive horizontal scan lines. The video signal is separated into a middle (M) scan line component and vertically adjacent top (T) and bottom (B) scan line components. These video signal components are employed to provide as a chrominance output signal either a combed chroma signal derived from the top, middle and bottom components, or an uncombed chroma signal derived from only one of the components. The selection of the combed chroma signal or the uncombed chroma signal is determined by a transistion detector which compares a vertical transition with a horizontal transistion and selects one of the signals as the chrominance output signal in dependance upon the comparison.

10 Claims, 2 Drawing Sheets

ADAPTIVE COMB FILTERING SYSTEM FOR PROCESSING VIDEO SIGNALS

RELATED APPLICATIONS

This application is related to my co-pending U.S. application Ser. No. 850,956, filed Apr. 11, 1986 and entitled "Noise Adjusted Recursive Filter" now U.S. Pat. No. 4,723,166 issued Feb. 2, 1988.

BACKGROUND OF THE INVENTION

This invention relates to the art of processing video signals and, more particularly, to improvements in filtering video signals.

Filters are known in the art and may be employed for separating the luminance and chrominance components of a composite NTSC color television signal. Two types of filters are employed including a bandpass filter and an adaptive comb filter. A bandpass filter, for example, may operate to receive the composite television signal and operate to pass a band of frequencies, centered about the chrominance frequency of 3.58 MHz, so as to pass the chrominance components and some high frequency luminance components. This bandpass filter signal may be considered as the separated out chrominance component and the luminance component can then be obtained by subtracting the chrominance component from the composite television signal. However, this bandpass filtered chrominance component, sometimes referred to as the filtered chroma, does include some high frequency luminance components. Adaptive comb filters are known which operate in certain conditions to provide a chrominance component relatively free of luminance components.

In a typical adaptive comb filter, the incoming video signal is separated by delay lines into line components representative of three successive television scan lines. These are typically referred to as the main or middle (M) line component and two vertically adjacent line components referred to as the top (T) and bottom (B) components. The middle (M) component and the top (T) component are respectively delayed by one and two horizontal lines relative to the bottom (B) component. The chrominance signal reverses in phase from line-to-line. When the three components are combined in the amplitude ratios of $T/2 + B/2 - M$, then, the luminance is cancelled out to thereby derive the negative of the chrominance component at twice its value, i.e., $-2C$. This derived chrominance component is sometimes referred to as the combed chroma, which is obtained from the adaptive comb filter, as opposed to the filtered chroma. The three line components B, T, and M may also be combined in such a manner that the chrominance cancels out leaving only the derived luminance component.

The separation and cancellation technique described above assumes there are no changes or transitions in picture detail from top to bottom through three successive lines. If substantial vertical transitions do take place, then smearing of the picture occurs in the vertical direction, presenting a loss in vertical picture detail. In such case, the comb filter is made inoperative and the chrominance output is the filtered chroma from a bandpass filter.

The prior art includes transition detectors which serve to determine whether there is a sufficient vertical picture detail or vertical transition to automatically select the combed chroma or the filtered chroma as the chrominance output signal. Such transition detectors are disclosed, for example, in the U.S. Pat. No. 4,050,084, to Rossi, and U.S. Pat. No. 4,072,984 to Kaiser. Kaiser's transition detector makes the selection of combed chroma or bandpass filtered chroma on the basis of vertical picture detail or vertical transition only. Horizontal transition is not considered. Rossi's transition detector makes the selection based on vertical transitions between the middle (M) line and the top (T) line and between the middle (M) line and the bottom (B) line along with a horizontal transition between an undelayed middle line pixel (M) and a delayed middle line pixel (M'). These transitions are individually compared against a reference and based on the comparisons, the detector selects either a combed chroma or a bandpass filtered chroma to serve as the output chrominance signal.

In the presence of vertical transitions, the comb filter algorithm begins to breakdown, in that the luminance signal does not cancel out, and chroma transitions are smeared over the three lines, reducing vertical resolution. It has been determined that bandpass filtering in the presence of horizontal transitions causes horizontal smearing, since high frequency luminance components are inverted along with the chroma. Low frequency luminance components are rejected by the bandpass filter, and so do not impair the output signal.

It is seen, then, that there is a trade-off as to whether the output chrominance signal should be obtained by bandpass filtering only, or by a comb filter. Thus, if there is more horizontal detail, then combing will preserve the horizontal detail with little loss of vertical detail. If there is more vertical detail, the vertical detail may be preserved by bandpass filtering. By comparing vertical transitions against horizontal transitions, a determination can be made as to which process, combing or bandpass filtering, will best preserve picture detail.

SUMMARY OF THE INVENTION

It is an object of the present invention to provide improvements in filters of the nature discussed above wherein a transition detector compares vertical and horizontal transitions in deciding whether to utilize the comb filtered output or the bandpassed filtered output as the chrominance output signal.

In accordance with the present invention, an adaptive comb filtering system is employed for separating the luminance and chrominance components of the composite video signal which includes a plurality of successive horizontal television scan lines. The video signal is separated into a middle (M) scan line component and vertically adjacent top (T) and bottom (B) scan line components. These components are utilized for deriving therefrom a combed chroma signal. An uncombed chroma signal is derived from one of the components. A transition detector selects as a chrominance output signal either the combed chroma signal or the uncombed chroma signal in dependence upon the point-by-point amplitude comparison of any vertical transitions to any horizontal transitions.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein.

DESCRIPTION OF A PREFERRED EMBODIMENT

Figure 1:
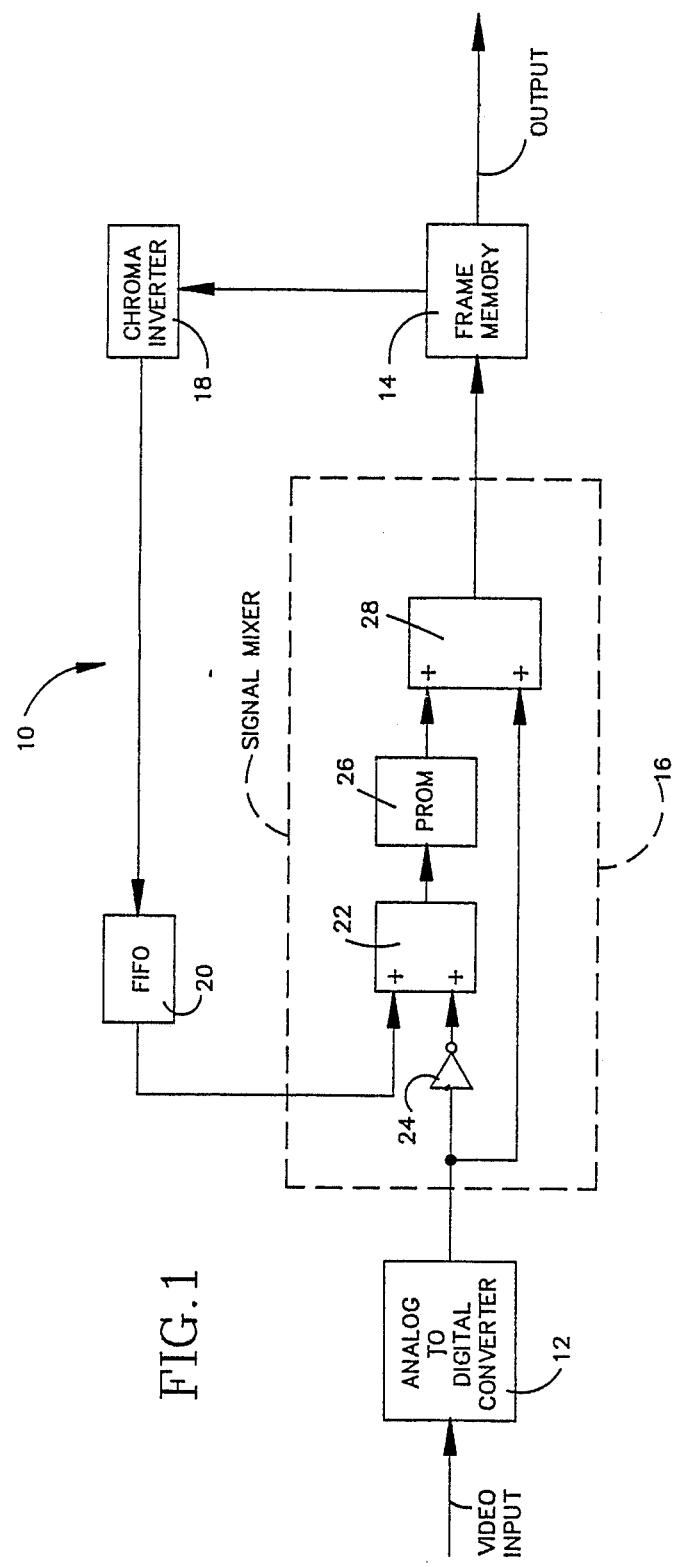
FIG. 1 is a block diagram illustration of a frame recursive filter which may be employed in conjunction with the present invention.

Reference is now made to the drawings which are presented for purposes of illustrating a preferred embodiment of the invention only and not for purposes of limiting the same. Reference is made to FIG. 1 which shows an application of the invention as applied to a digital noise reducer which serves to reduce noise in a color television signal. Such a digital noise reducer may be employed as a portion or in conjunction with a frame synchronizer for processing video signals. The composite video signal may be initially applied to a low-pass filter (not shown) for passing video signals up to a frequency on the order of 5.5 MHz. This is within the range of operation of an analog-to-digital converter 12 which converts the analog video signal into a train of eight bit digital samples which may be supplied to a frame storage, in the form of frame memory 14, for subsequent use. In this application, the output of the analog-to-digital converter is noise reduced by the noise reducer 10. This may take a form conventional in the art and, for example, in the embodiment illustrated, it takes the form of a frame recursive filter employing a signal mixer 16, the frame memory 14, a chroma inverter 18 and an asynchronous first in, first out memory buffer 20 connected as illustrated in FIG. 1. This digital noise reducer is a frame recursive filter wherein each pixel of a stored image in the frame memory 14 is successively updated once per frame by mixing it at a signal mixer 16 with incoming data obtained from the analog-to-digital converter 12, with the incoming data corresponding to the same pixel location. The mixer ratio employed will control the degree of filtering. If mostly memory data is used in the mix, then the degree of filtering is high, and the image will be slow to respond to changes (motion or noise) in the input signal. If mostly input data is used, then the degree of filtering is low, and the image will quickly respond to changes in the input signal. Pixel differences which are small are assumed to be the result of random noise, and are consequently heavily filtered. Differences which are large are assumed to be the result of motion in the picture, and are lightly filtered.

The eight bit frame delayed signal obtained from the frame memory 14 is supplied to the signal mixer by way of the buffer 20 and is supplied to one input of an ADDER 22. The present input video signal as obtained from the analog-to-digital converter 12 is supplied to the second input of ADDER 22 by way of an inverter 24 such that the output as taken from ADDER 22 represents the difference between the frame delayed signal and the input signal. This difference signal is supplied as a nine bit address to a mix control PROM 26. The mix control PROM 26 outputs an eight bit signal which is a fractional part of the nine bit difference signal from ADDER 22. The output of PROM 26 is added to the input video signal by means of an ADDER 28 to provide an eight bit output.

Because the chroma signal phase changes 180° between one frame and the next in an NTSC video signal, a chroma inverter 18 is employed in the frame delayed data path (otherwise, the chroma signal would be lost in the mixing process). The chroma inverter 18 is an adaptive filter used in the frame delayed signal path to extract the chroma portion of the signal, invert its polarity, and recombine it with the noninverted luminance portion of the signal, thereby correcting the chroma phase difference between the input and frame delayed signals prior to mixing the signals at mixer 16. The chroma inverter 18 preferably takes the form described below with respect to FIG. 2.

Figure 2:
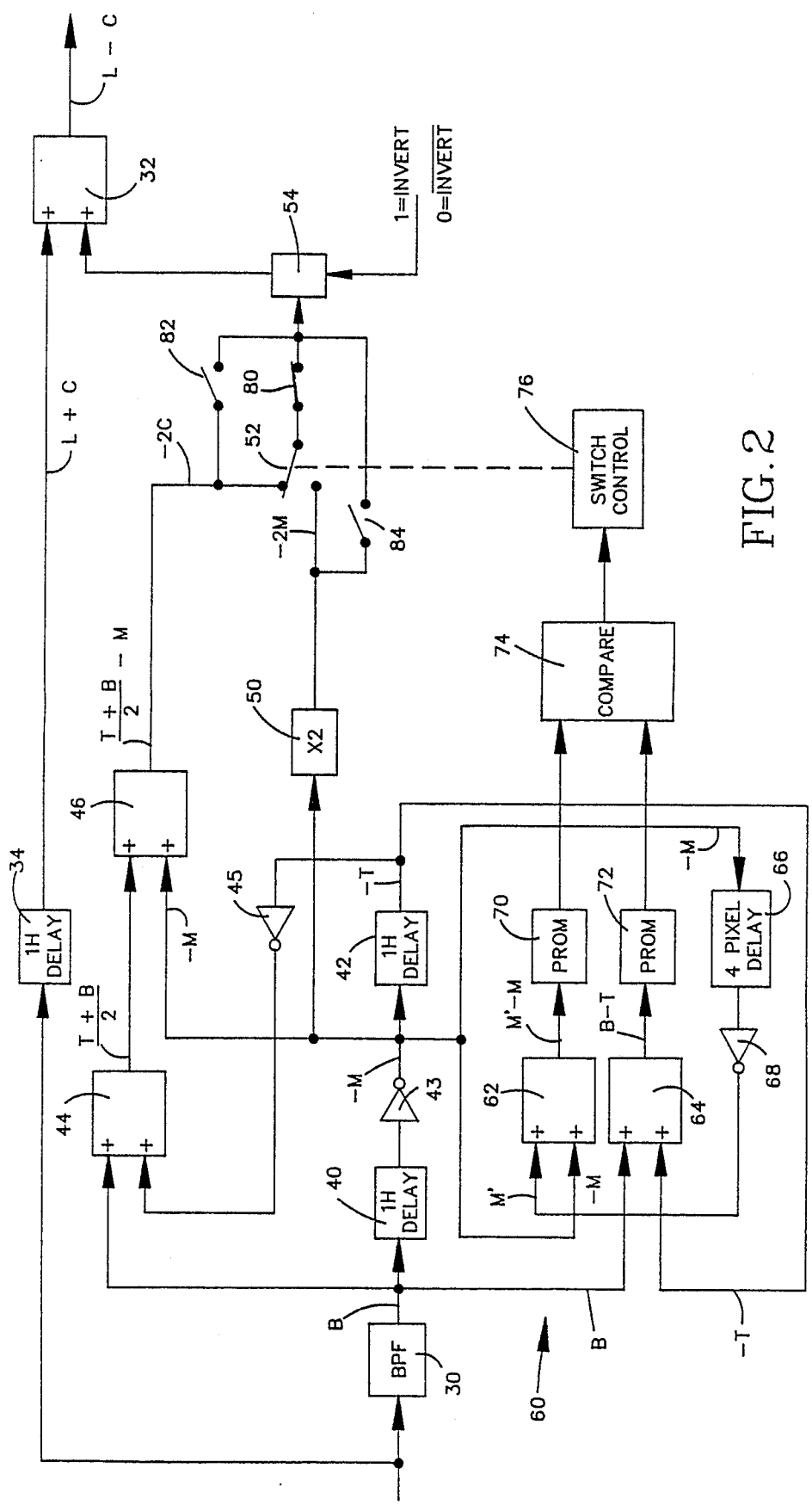
FIG. 2 is a schematic-block diagram illustration of the improved adaptive comb filter system in accordance with the present invention.

Having now described one application to which the present invention may be applied, reference is now made to FIG. 2 which provides a more detailed representation of the chroma inverter circuitry. The digitized eight bit samples of the composite video signal are supplied to the chroma inverter 18 and are filtered by a bandpass filter 30 which is centered at the chroma frequency of 3.58 MHz. The bandwidth of this filter may be on the order of from approximately 2.58 MHz to 4.58 MHz so that it passes the chroma signal along with some high frequency luminance components. The unfiltered composite signal which includes full band luminance and chrominance components is supplied to an output ADDER 32 by way of a one scan line delay 34. The delay imposed by a one line delay should be on the order of 63.5 microseconds or one television scan line. This unfiltered composite signal will be combined with the output of the adaptive filter at the ADDER 32.

The adaptive filter circuit operates to provide a chrominance signal to be combined with the unfiltered composite signal at ADDER 32. This chrominance signal is either a combed chroma signal or is a bandpass filtered signal which has not been combed. A transition detector determines which of these two signals will be employed as the output chrominance signal.

The adaptive filter employs circuitry for separating the filtered composite signal into a middle (M) scan line component and vertically adjacent top (T) and bottom (B) scan line components. This is achieved through the use of one line delays 40 and 42, each of which serves to delay the input signal by one television line which is on the order of 63.5 microseconds. This, then, provides an undelayed bottom line component B, a one line delayed middle line component M and a two line delayed top line component T. An inverter 43 is located in the signal path between delay 40 and delay 42 so that the middle line component is inverted in phase. Line component B is applied to one input of an ADDER 44. The output of the delay 42 is inverted by an inverter 45 so as to supply a noninverted line component T to the second input of ADDER 44. This adder provides an output of one-half of the sum of components T and B in accordance with equation (T+B)/2. This signal is then supplied to another ADDER 46, which receives the inverted middle line component −M. ADDER 46 provides an output corresponding to (T+B)/2−M which serves as the combed chroma output of the adaptive filter. In the absence of vertical transitions, the components T, B and M can be characterized as:

$$M = L + C, \text{ where } L = \text{luminance}, C = \text{Chroma}$$

$$T = L - C$$

$$B = L - C$$

so that: $(T+B)/2 = L - C$, and $(T+B)/2 - M = -2C$

This means that in the absence of vertical transitions, the luminance components from the three lines cancel out, and the combed output signal is all chroma at two times normal amplitude, and inverted in phase. This is the signal −2C. This signal −2C may be considered as the combed chroma which has been combed in accordance with the comb filter algorithm performed by ADDERS 44 and 46.

The uncombed filtered output will be provided during periods of transition as detected by the transition detector. This output may take the form of a bandpass filtered signal only, no combing involved. This is obtained from the output of inverter 43 which is multiplied by a factor of 2 by a suitable multiplier 50 to provide the signal −2M. The selected chrominance output, either the signal −2C or −2M, is applied to the ADDER 32 by way of a switch 52 and an inverting circuit 54. The inverting circuit 54 is toggled by a control signal for each frame so that on alternate frames, the chrominance signal is inverted before being added to the unfiltered composite signal. This is done because the chroma signal phase changes 180° between one frame and the next in an NTSC video signal.

In the presence of vertical transitions, the comb filter algorithm begins to break down in that the luminance signal no longer cancels out and chroma transitions are smeared over three lines, reducing vertical resolution. In accordance with the present invention, the transition detector 60 shown in FIG. 2 operates to compare horizontal and vertical detail and if vertical detail predominates the comb filter is disabled and the −2M signal is outputted as the chrominance signal. This preserves vertical resolution, but may impair horizontal resolution, since high frequency luminance components are inverted along with the chroma. Low frequency luminance components are rejected by the bandpass filter 30 and, hence, do not impair the output signal.

The transition detector 60 includes a pair of ADDERS 62 and 64. ADDER 62 receives the inverted middle line component −M from inverter 43. The component −M is also supplied to a four pixel delay 66 and then inverted by an inverter 68 so as to apply an in-phase delayed component M′ to ADDER 62. ADDER 62 also provides an output M′−M indicative of the horizontal transition spaced four pixels apart. This transition or difference represents the signal difference which is comprised of both luminance and chrominance information, since some high frequency luminance is passed by bandpass filter 30. This is supplied to a PROM 70 which provides an output which is a function of the detected transition M′−M.

In a similar manner, the bottom line component B and inverted top line component −T are supplied to ADDER 64, which then provides as an output their difference or transition B-T. This is supplied to a PROM 72 which provides an output which is a function of that transition. These two transitions M′−M and B-T are compared with a comparator 74 and, if the vertical transition B-T is greater than the horizontal transition M′−M, then, the comb filter is disabled and the uncombed bandpass filtered signal −2M is output as the chrominance signal. Otherwise, the combed chroma signal −2C is outputted as the chrominance signal. Consequently, then, if the vertical transition exceeds the horizontal transition comparator 74 supplies a control signal to the switch control 76 which operates switch 52 to output the uncombed bandpass filtered signal −2M as the chrominance signal. The comparator may be constructed so as to have an offset favoring either the horizontal or vertical transition in selecting the uncombed signal −2M on the combed signal −2C.

In the description thus far, the selection of whether to output as the chrominance signal the combed signal −2C or the uncombed signal −2M has been automatic. It may be desirable in certain applications to override this automatic control and to cause the chrominance output signal to always be the combed signal −2C or always be the uncombed signal −2M. In such case, the normally closed switch 80, interposed between switch 52 and inverter 54, is opened. This permits the operator to manually override the function by closing either normally open switch 82 or normally open switch 84. The closure of switch 82 will cause the output chrominance signal to always be the combed chroma signal −2C. Alternatively, leaving switch 82 open but closing switch 84 will cause the output chrominance signal to always be the uncombed signal −2M.

Although the invention has been described in conjunction with a preferred embodiment, it is to be understood that various modifications may be made without departing from the spirit and scope of the invention as defined by the appended claims.

Having described a preferred embodiment of the invention, the following is claimed:

1. An adaptive comb filtering system for use in separating luminance and chrominance components of a composite video signal which includes a plurality of successive scan lines comprising:
   means for receiving said composite video signal and separating said video signal into a middle (M) scan line component and vertically adjacent top (T) and bottom (B) scan line components;
   means responsive to said middle, top and bottom scan line components for deriving a combed chroma signal therefrom;
   means for deriving from one of said scan line components an uncombed chroma signal; and
   signal selection control means for selecting as a chrominance output signal either said combed chroma signal or said uncombed chroma signal in dependence upon the relative relationship of any vertical transition of two of said scan line components to any horizontal transition of one of said scan line components.

2. A system as set forth in claim 1 wherein said signal selection control means includes means for determining said vertical transition as the difference between two of said scan line components.

3. A system as set forth in claim 2 wherein said two scan line components are said bottom component B and said top component T.

4. A system as set forth in claim 1 including means for delaying said M middle scan line component to provide a delayed middle scan line component M′ and means for determining the difference between said delayed component M′ and said component M to provide said horizontal transition.

5. A system as set forth in claim 4 including means for determining the difference between said top scan line component T and said bottom scan line component B to provide said vertical transition.

6. A system as set forth in claim 5 including means for comparing said vertical transition with said horizontal transition for use in controlling the selection of said chrominance output signal in dependence thereon.

7. A system as set forth in claim 6 including bandpass filtering means for passing the chrominance component of said video signal and located such that at least said M middle scan line component is a bandpass filtered component from which said uncombed chroma signal is derived.

8. A filter system for use in separating luminance and chrominance components of a composite video signal comprised of a plurality of successive scan lines, comprising:
   means for receiving said video signal and separating said video signal into a middle scan line component and vertically adjacent top and bottom scan line components;
   comb filtering means for receiving said bottom, middle and top scan line components and deriving therefrom a combed chroma signal;
   means for deriving from one of said scan line components an uncombed chroma signal;
   actuatable output signal selecting means for selecting either said combed chroma signal or said uncombed chroma signal as an output chrominance signal;
   transition detector means for detecting any vertical signal transition between two of said scan line components and any horizontal signal transition of the other of said scan line components; and
   comparison means for comparing said vertical and horizontal transitions and actuating said signal selecting means for selecting said combed chroma signal or said uncombed chroma signal as said output chrominance signal in dependence upon said comparison.

9. A system as set forth in claim 8 wherein said transition detector means includes means for determining any difference between said top and bottom scan line components as said vertical transition.

10. A system as set forth in claim 9, including means for delaying said middle scan line component to provide a delayed middle component, and means for determining any difference between said delayed middle component and the undelayed said middle scan line component as said horizontal transition.

* * * * *

UNITED STATES PATENT AND TRADEMARK OFFICE
CERTIFICATE OF CORRECTION

PATENT NO.   :   4,803,547
DATED        :   Febuary 7, 1989
INVENTOR(S)  :   Boyd L. Stratton It is certified that error appears in the above-identified patent and that said Letters Patent is hereby corrected as shown below:

Column 6, line 61, delete "middle scan line".

Signed and Sealed this

Twenty-fifth Day of July, 1989

*Attest:*

DONALD J. QUIGG

*Attesting Officer*      Commissioner of Patents and Trademarks